United States Patent

[11] 3,603,622

| [72] | Inventor | Adrian Anthony Cecil March<br>Oaklea, Hartfield, Sussex, England |
|---|---|---|
| [21] | Appl. No. | 837,727 |
| [22] | Filed | June 30, 1969 |
| [45] | Patented | Sept. 7, 1971 |
| [32] | Priority | July 4, 1968 |
| [33] | | Great Britain |
| [31] | | 32,036/68 |

[54] FIXING DEVICES FOR STRUCTURAL MEMBERS AND CLADDING
6 Claims, 4 Drawing Figs.

[52] U.S. Cl. .................................................287/20.927,
287/20.92 C, 52/710
[51] Int. Cl. ............................................................. F16b 3/04
[50] Field of Search............................................. 287/189.36
F, 189.36 C, 189.36, 20.92 C, 20.92 B, 23,
20.924–20.927, 189.35; 285/307; 52/573, 665,
710, 711, 717, 730

[56] References Cited
UNITED STATES PATENTS
| 2,498,590 | 2/1950 | Straus........................... | 287/23 UX |
| 2,809,726 | 10/1957 | Farquhar et al. ............. | 287/189.36 F |

*Primary Examiner*—David J. Williamowsky
*Assistant Examiner*—Wayne L. Shedd
*Attorney*—Beale and Jones ABSTRACT: A fixing device for securing roof members such as cladding panels to the main frame members of a building said roof members having a fixing channel provided with a longitudinally disposed engageable formation said fixing device having a tongue for entry into said channel, a laterally displaceable complementary member mounted on said tongue for engagement with said formation in said fixing channel and wedging means for example a screw associated with said device for effecting lateral displacement of said complementary member to the engaged position.

PATENTED SEP 7 1971

3,603,622

FIXING DEVICES FOR STRUCTURAL MEMBERS AND CLADDING

This invention relates to fixing devices for structural members and cladding of buildings.

One of the problems resulting from the introduction of new building techniques in which the building includes cladding secured to main members is the difficulty of permitting relative movement in order to allow for thermal expansion. This problem is aggravated by the use of metallic cladding such as aluminum sheeting in which the expansion under normal temperature changes can be as much as three-eighths inch in a length of 24 feet. With the demand for large sheet sizes and a minimum number of fixing points per unit area the relative movement is far too large to be accommodated by the use of nails or screws disposed in oversize holes.

It becomes desirable, therefore, positively to locate each cladding panel by the use of a small number of fasteners which will resist movement in any direction, and to ensure that the other fasteners, while offering the maximum resistance to loads imposed on the cladding, offer negligible resistance to thermal expansion movement in the plane of the panel. Additionally, it is desirable that no fastener should be dependent for installation or subsequent operation on the precise angular alignment of cladding and supporting structure.

One of the objects of the present invention is to provide an improved fixing device which will afford a secure but yieldable fixing that will accommodate the increased relative movement called for by modern building methods.

According to the present invention there is provided a fixing device for engagement with a fixing channel having a longitudinally disposed rib or groove said device having a tongue for entry into said channel, a laterally displaceable complementary component mounted on said tongue and means for effecting lateral displacement of said component for engagement with said rib or groove.

The laterally displaceable component may be a spring member and the means for effecting lateral displacement relative to the tongue may be a wedging member for example a screw. The channel of the member to which the device is to be applied may be provided with a groove on at least one side of said channel and the complementary laterally displaceable component may be a length of wire mounted on said tongue in a groove provided therein which can be pressed outwardly of said tongue to extend beyond the face of said tongue without disengagement from said groove in said tongue. Where said tongue is grooved on opposite faces for said wire the wire may be formed as a U and made of spring wire bent to provide a spring return into said grooves to permit disengagement of said tongue from said channel. The means for effecting lateral displacement of the complementary component may in an alternative embodiment also provide means for locking the fixing member against longitudinal movement in said channel.

Referring to the accompanying drawings.

Figure 1:
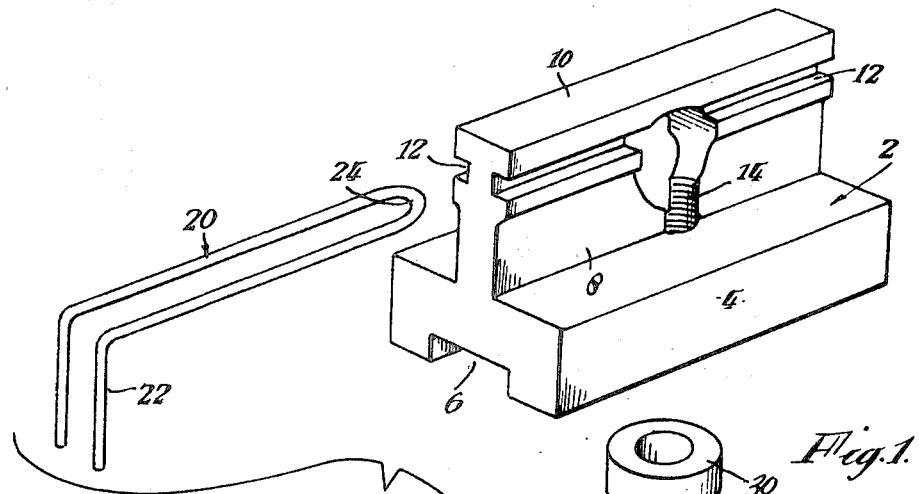
FIG. 1 is an isometric exploded view of one form of securing device made in accordance with the present invention.
Figure 3:
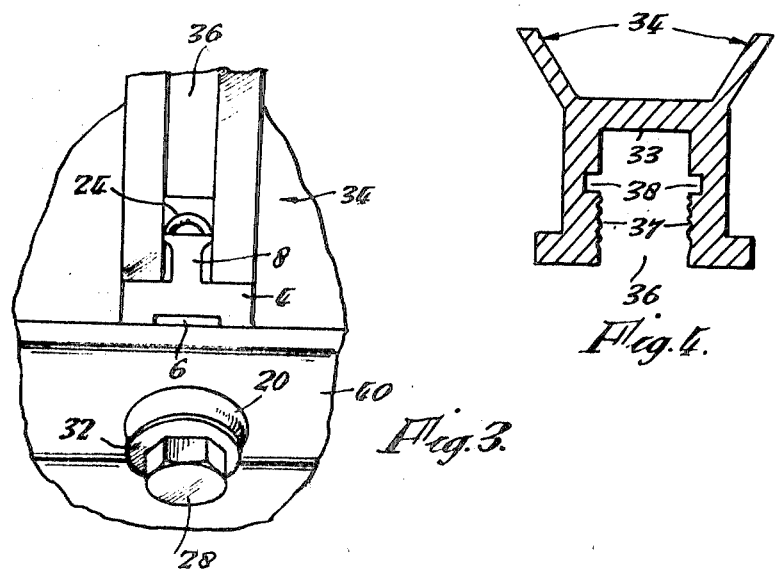
FIG. 3 is an underneath isometric view of the device showing a structural extruded aluminum roof member secured to a supporting angle piece.
Figure 4:
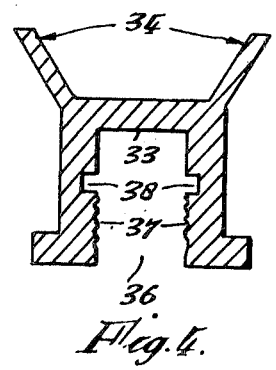
FIG. 4 is a transverse section through a roofing member.

In the form shown in Figs. 1 and 3, the fixing device comprises a body portion 2 of extruded aluminum alloy about 1¼ inches in length and seven-eighths inch in depth and roughly of inverted T section the base 4 having a longitudinal channel 6 on its underside. The tongue of the device is the stem of the T section and is constituted by a web 8 which has an enlarged end or head 10 of bullhead shape formed with a longitudinal groove 12 on each side; said grooves being of substantially rectangular cross section. The base 4 is drilled centrally with a tapped hole 14 which extends partly into the head 10 and breaks through the sides of the web 8. In addition to constituting a saving of material, the presence of the channel 6 ensures that the flat seating of the base 4 on the supporting structure is not prevented by burrs or rough edges round the end of the tapped hole 14, or the corresponding hole in the structure. The laterally displaceable complementary component is constituted by a hairpin-shaped member 20 of stainless steel the ends 22 of which have been bent at right angles to the plane of the hairpin and are dimensioned to fit in the grooves 12 with the bent over ends 22 resting against one end of the head 10 preventing longitudinal movement in one direction whilst the loop 24 fits snugly against the head 10 at the other end to prevent longitudinal movement in the other direction. A threaded screw 28 for which a resilient washer 30 of Neoprene and metal washer 32 are provided is adapted to be engaged with the threaded hole 14 after passing through the member to which the cladding or structural roofing member is to be secured. As will be seen from Fig. 4 the structural roofing member 34, of which only a fragment of the portion having the fixing channel is shown in this figure, has a channel 36 of rectangular internal cross sectional shape formed with a groove 38 on each side of similar portions to the grooves 12 in the enlarged end of head 10 of the fixing device. The roofing member is shown in this figure secured to an angle member 40.

In use when the tip of the screw 28 engages between the legs of the hairpin 20 these are expanded and the wire in the central portion is forced partly out of the grooves 12 into the grooves 38, being restrained at one end by the loop 24 of the hairpin and at the other end by the bent-over ends 22 bearing against the lower inside walls 37 of the channel 36. The bolt 28 can then be tightened until the point engages the bottom of the threaded hole 14 by which time the Neoprene washer 30 will have been compressed as shown in Fig. 3 and the body of the fixing device held down firmly onto the angle member 40.

Although the device has been shown in use for securing a structural roofing member it can equally well be used for securing cladding provided with the cladding has a fixing channel into which the tongue of the fixing device can be inserted and engaged.

It will be obvious that since the screw cannot engage the base of the channel in the structural roof member 34 the structural roof member can slide over the fixing device.

Figure 2:
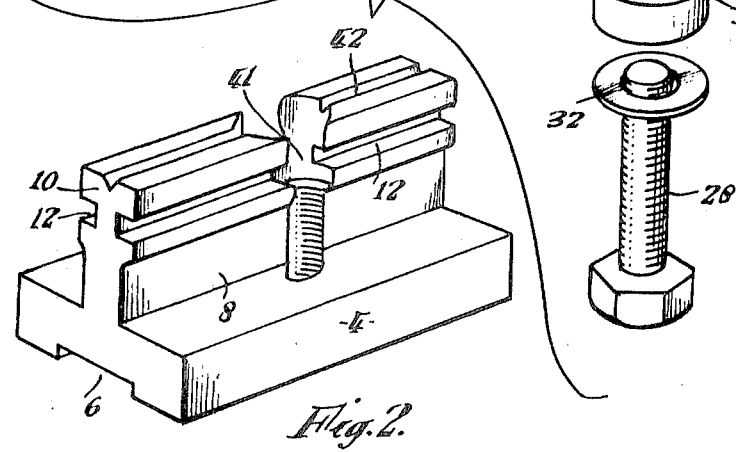
FIG. 2 is an isometric view of a modified form of fixing device body.

In the modified form of device shown in Fig. 2 the threaded hole 14 has been extended through the head 10 so that the tip of the screw 28 can be engaged with the bottom 33 of the channel 36 on the structural roof member 34 or cladding member and by such engagement any longitudinal movement of the roof member or cladding relative to the body 2 of the fixing device is prevented. A corresponding reduction is made in the thickness of the base 4 to enable the same length of screw 28 to be used as in the embodiment shown in Fig. 1, and to avoid confusion between the two closely similar sections in the course of manufacture, the modified section shown in Fig. 2 carries a distinguishing feature in the form of a longitudinal groove 42 along the top of the head 10.

What I claim and desire to secure by Letters Patent is:

1. A fixing device for securing a roof member to a main frame member, said roof member having a fixing channel provided with a longitudinally disposed groove means along at least one sidewall thereof, wherein said fixing device is attached to said roof member, said fixing device including:

a. a body provided with a tongue which is fitted between and adjacent to the sidewalls of the fixing channel, said tongue having a groove means along at least one side thereof, said tongue groove means being aligned with the groove means in the sidewall when the roof member and the fixing device are in assembled relation;

b. an expandable member receivable within the tongue groove, said sidewall groove being capable of receiving at least a portion of the expandable member; and c. a fastening wedge means movably carried by said body and extending into engagement with the expandable member, whereby when said channel and frame member are in assembled relation and the fastening wedge is tightened, said portion of the expandable member is expanded into the longitudinally disposed groove of the channel sidewall.

2. A fixing device for securing a roof member having a fixing channel provided with a longitudinally disposed groove means along each sidewall, wherein said fixing device is attached to said roof member, said fixing device including:
   a. a body provided with a tongue which is fitted between and adjacent to the sidewalls of the fixing channel, said tongue having a groove means along at least two sides thereof, said tongue groove means being aligned with the sidewall groove means when the roof member and the fixing device are in assembled relation,
   b. resilient hairpin member with the legs of the hairpin member receivable within the tongue groove means, said sidewall grooves being capable of receiving a portion of the legs of the hairpin member; and
   c. a fastening wedge means movably carried by said body and extending into engagement with the legs of the hairpin members, whereby when said channel and frame member are in assembled relation and the fastening wedge is tightened, said portion of the legs are expanded into the longitudinally disposed grooves of the channel sidewalls as the fastening wedge is tightened.

3. A fixing device according to claim 2 wherein said hairpin member is a spring member stressed for return action and consists of a U-shaped length of spring wire mounted in a complementary shaped groove in said tongue.

4. A fixing device according to claim 2 wherein the fastening wedge is a screw.

5. A fixing device according to claim 2 wherein the fastening wedge is extended into engagement with the fixing channel to prevent any longitudinal movement of the roof member relative to said body.

6. A fixing device according to claim 2 wherein the fastening wedge also secures said fixing device to said frame member.